Nov. 19, 1968  E. WEIL  3,411,460
ICEBOX COOKIE MACHINE
Filed July 7, 1966  3 Sheets-Sheet 1
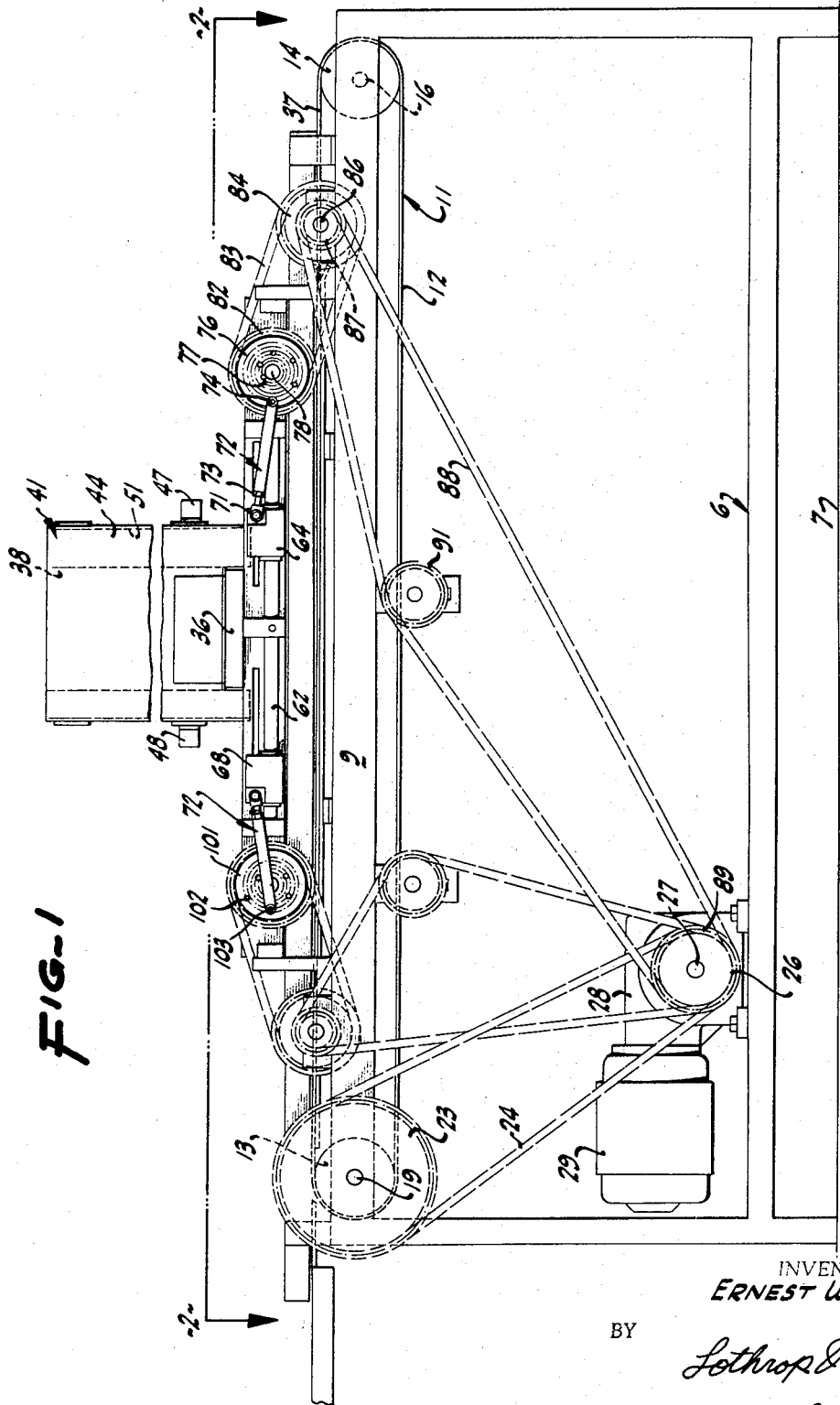
INVENTOR.
ERNEST WEIL
BY
Lothrop & West
ATTORNEYS

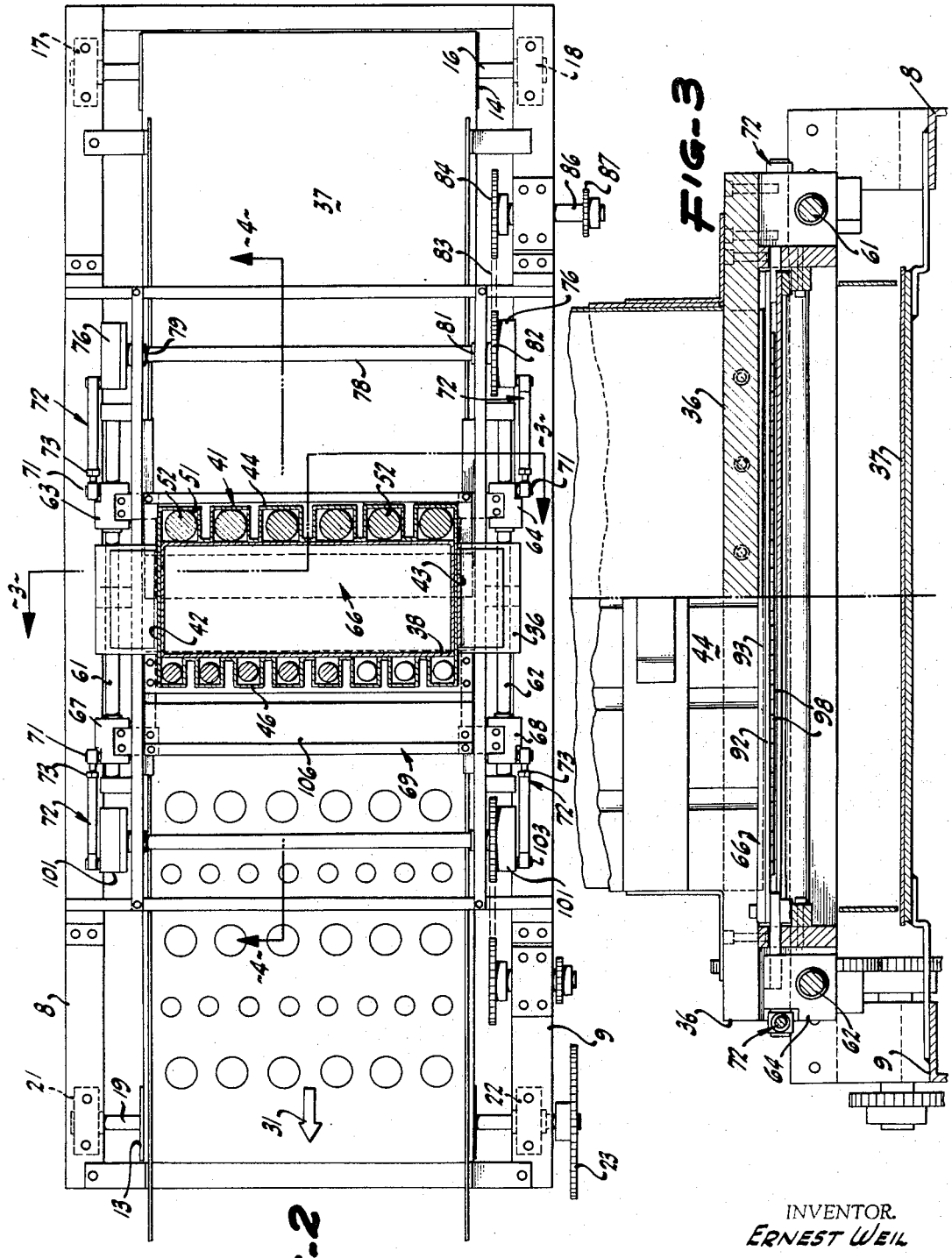

Nov. 19, 1968  E. WEIL  3,411,460
ICEBOX COOKIE MACHINE
Filed July 7, 1966  3 Sheets-Sheet 3
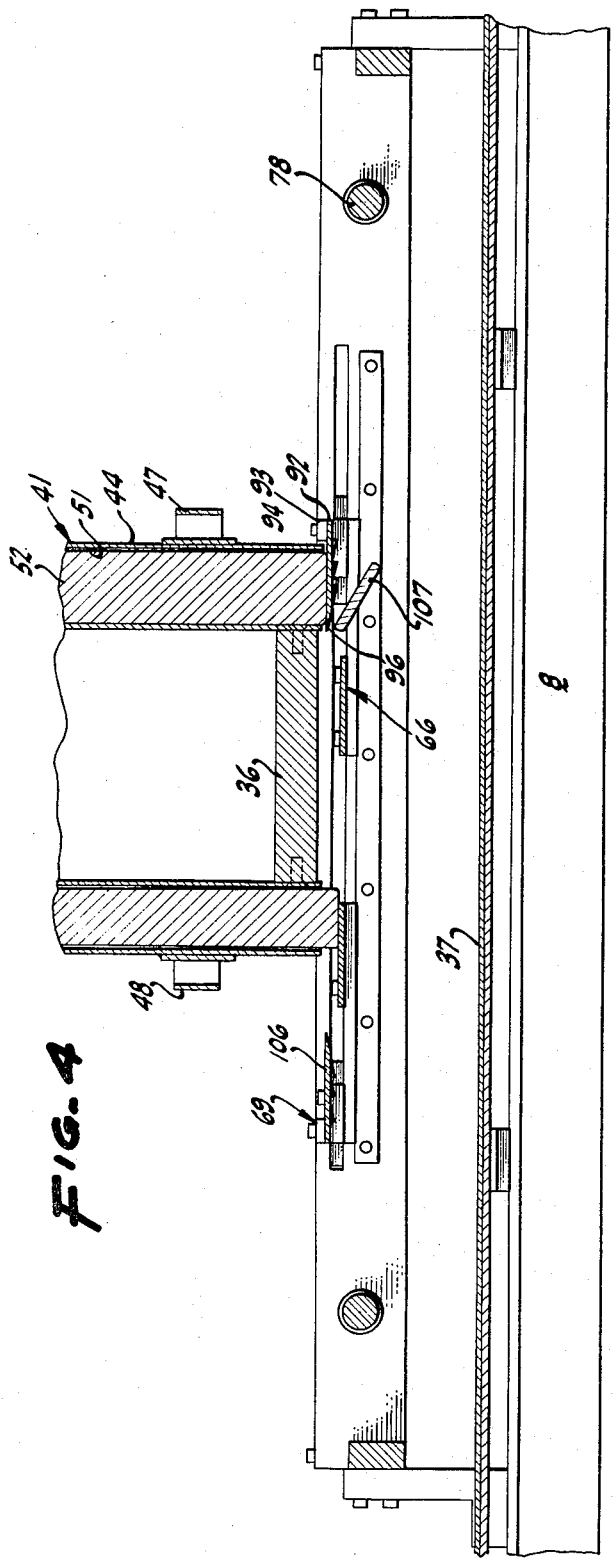
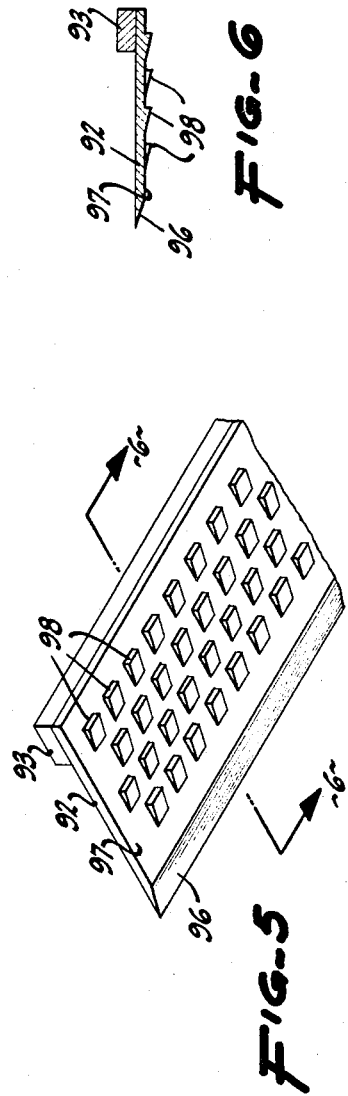
INVENTOR.
ERNEST WEIL
BY
Lothrop & West
ATTORNEYS United States Patent Office 3,411,460
Patented Nov. 19, 1968

3,411,460
ICEBOX COOKIE MACHINE
Ernst Weil, San Francisco, Calif., assignor to Fantasia Confections, Inc., a corporation of California
Filed July 7, 1966, Ser. No. 565,048
5 Claims. (Cl. 107—1)

ABSTRACT OF THE DISCLOSURE

Vertically extending cookie dough guides are arranged in two groups disposed transversely of a subjacent conveyor belt, the groups being spaced apart in the direction of belt travel. Each group has a supporting plate and a cutting plate reciprocating in the direction of belt travel just beneath the cookie dough guides. The supporting plates and cutting plates of the two groups are reciprocated in selectively timed phase relationship to each other and with selected stroke length.

My machine relates to devices for automatically cutting and depositing cookies on a baking sheet and is especially concerned with a device of the general sort shown in Furlong Patent 2,583,940 issued Jan. 29, 1952 for an ice box cooky cutter and method.

It is in general an object of the invention to improve on the device shown in the mentioned patent.

Another object of the invention is to provide an icebox cookie machine which is capable not only of cutting cookies prior to baking, but also of arranging them in particular ways and in multiple for novelty effects.

Another object of the invention is to provide an icebox cookie machine which can also be utilized to provide other comestibles beside cookies.

A further object of the invention is to provide an icebox cookie machine of considerably increased versatility and capacity over machines heretofore available.

Another object of the invention is to provide an icebox cookie machine in which the mechanical functioning of the machine is improved over previous devices, particularly insofar as handling the cookie dough is concerned.

An additional object of the invention is to provide an icebox cookie machine which can operate automatically for a protracted time.

Other objects together with the foregoing are attained in the form of icebox cookies machine described in the accompanying description and illustrated in the accompanying drawings, in which:

FIGURE 1 is a side elevation of an icebox cookie machine as actually constructed pursuant to the invention;

FIGURE 2 is a cross section, the plane of which is indicated by the line 2—2 of FIGURE 1, and showing the machine in plan;

FIGURE 3 is a multiple cross section, the planes of which are indicated by the lines 3—3 of FIGURE 2;

FIGURE 4 is a cross section, the plane of which is indicated by the line 4—4 of FIGURE 2;

FIGURE 5 is an isometric perspective showing a cutter plate; and

FIGURE 6 is a cross section, the plane of which is indicated by the line 6—6 of FIGURE 5.

While the icebox cookie machine pursuant to the invention has a number of different uses and can take a number of different forms, it has successfully been operated in the form shown herein for the manufacture of icebox cookies; that is, the division of the prepared dough rolls into individual disks ready for subsequent baking.

The machine includes a main frame 6 comprised of the customary metallic shapes and is supported on the floor 7. The main frame 6 has a pair of horizontally extending longitudinal beams 8 and 9 serving as a sort of table for the support of the major portion of the structure.

Arranged alongeside of and extending to points adjacent the opposite ends of the beams 8 and 9 on the main frame is a conveyor 11. This includes a belt 12 almost as wide as the width of the machine and trained around a driving drum 13 and a driven drum 14. The drum 14 is supported on a cross shaft 16 carried in bearings 17 and 18 resting on the main frame, whereas the drum 13 is supported on a driving shaft 19 also carried by journals 21 and 22 on the main frame. At one end the driving shaft 19 supports a sprocket 23 joined by a chain 24 to a driving sprocket 26. This is mounted on a shaft 27 of a speed reducer 28 driven by an electric motor 29. When the shaft 27 is correspondingly driven, the driving shaft 19 is also rotated to drive the conveyor belt 12. The direction of advance is toward the left in FIGURE 2 as shown by the arrow 31.

Arising from the main frame 6 and extending above and athwart the beams 8 and 9 is a superstructure 36 overlying the upper run 37 of the conveyor 11. Upstanding from the central portion of the superstructure is a generally hollow support trunk 38. The space enclosed by the trunk 38 is shown unoccupied but can be utilized for heat transfer equipment such as heating or cooling coils to maintain an appropriate temperature of the surroundings. For that reason, the trunk is preferably of relatively thin but stiff sheet metal.

Detachably arranged to telescope with the trunk 38 is a guiding structure 41 for positioning and guiding a number of rolls of cookie dough. Conveniently, the guide structure 41 is a relatively light sheet metal envelope having side walls 42 and 43 adapted to lie in sliding engagement with the similar side walls of the trunk 38. On one end, the walls 42 and 43 continue in a convoluted end wall 44. On the other end, the walls 42 and 43 continue in a convoluted end wall 46. The side walls 42 and 43 are provided with handle 47 and 48 so that the guide mechanism 41 can be lifted vertically off of the trunk 38 and can be introduced and telescoped thereover by a vertical downward movement. By this construction no small, closed tubes remain and access is readily had to all of the mechanism for inspection and cleaning.

The convoluted wall 44 is arranged to provide a plurality, in this instance six, of individual roll guides 51. Each of these is open at the top and at the bottom but has its side walls positioned to confine loosely an inserted discrete roll 52 of icebox cookie dough. Reference to icebox cookie dough is not intended to be restrictive, but rather to identify material generally in definite or stable roll or cylindrical form, whether circular or rectangular in cross section or of other cross sectional shape, and which is an integral body and which is not sticky or tacky and does not slump in or adhere to the guide walls. Each of the guides, such as 51, is effective to locate and contain for sliding motion a similar roll 52 so that the wall 44 confines six such rolls across the machine.

Similarly, the wall 46 is arranged to receive eight rolls of cookie dough. Since the guide mechanism 41 can readily be lifted off and replaced, it is possible to have either the same number of guides on either side of the trunk or a different number, as shown herein, or to place the guides in longitudinally aligned position in the direction of the arrow 31 or in staggered location considered in the direction of the arrow 31. This affords great versatility in the functioning of the machine.

Means are provided for supporting the rolls 52 of dough and also for slicing of severing portions of the dough and depositing those portions directly onto the subjacent conveyor upper run 37 or onto separate cookie sheets carried by the upper run 37. Since much of the structure is duplicated, a description of one portion thereof is intended to apply equally to the other portion.

Ranging along the side beams 8 and 9 and extending longitudinally of the machine are a pair of rods 61 and 62 anchored in placed and serving as ways. Running on the ways 61 and 62 toward one end of the machine are sleeves 63 and 64 joined by a cross member 66. Similarly, sleeves 67 and 68 run on the ways 61 and 62 near the other end of the machine. These likewise are joined by a cross member 69. The cross member 66 is reciprocated in the direction of the arrow 31, and return, in a plane between the lower end of the guide 41 and the upper run 37 of the conveyor.

Each of the sleeves, such as 64, is provided with a crank pin 71 engaged by a pitman 72 of adjustable length. The pitman is in two parts having a threaded interconnection and a jam nut 73. The pitman 72 is joined by a crank pin 74 to a driving disk 76. The crank pin 74 is readily removable from the crank disk 76 and is re-engageable therewith in any one of a number of threaded openings such as 77. The openings are arranged at approximately equal angular intervals but at different radii, preferably in the path of a spiral, so that the stroke of the cross member 66 can be varied and so that the phase of the cross member 66 can be varied. That is, by having different holes at different angular positions but at the same radii, the phase only can be changed and by having different radii at different angularity, the stroke only can be changed. Finally, by having holes at different angularities and different radii, both the phase and the stroke can be changed.

The driving disk 76 is duplicated on the opposite side of the machine and both driving disks are mounted on a driving shaft 78 carried in journals 79 and 81 on the main frame. Near one end the driving shaft 78 is provided with a sprocket 82 connected by a chain 83 to a lay sprocket 84 on a lay shaft 86. A similar sprocket 87 also on the lay shaft 86 is joined by a chain 88 to a sprocket 89 on the driving shaft 27, there being an idler 91 on the main frame 6 adjustable for arranging the chain tension. By this series of connections, the driving motor 29 is effective to drive the cross member 66 in a reciprocatory path in any of several different phases and in any of several different stroke lengths. Also, the position of the cross member 66 longitudinally of the machine can be varied by changing the length adjustment of the pitman 72.

The cross member 66 can also be considered as a support plate in that it has a planar, generally horizontal, upper surface designed to travel beneath the rolls 52 of dough in the guides 51 and upon occasion to underlie those rolls of dough and to serve as a temporary support therefor as shown in FIGURE 4. The dough is sufficiently integral so that the support plate can slide underneath the column or roll of dough without adhering thereto while continuing the support function.

The cross member 66 or support plate is supplemented by a cutter plate 92. This is shown in considerable detail in FIGURES 5 and 6 and comprises generally a rectangular planar plate fastened in place and retained on a stiff cross member 93 appropriately bolted by fastenings 94 to the reciprocating mechanism. The general plane of the cutter is somewhat higher than that of the support plate. The cutter plate along its leading edge is provided with a tapered and sharpened portion 96 and its nether surface 97 is largely covered by a number of wedges 98 spaced apart both transversely and longitudinally and staggered with respect to each other. The wedges 98 are arranged with their thinner portion in the same direction as the thinner portion of the knife edge 96.

In a comparable fashion, the cross member 69 can likewise serve as a support plate. It also is reciprocated by a drive mechanism as previously described and also connected to the driving shaft 27. It is particularly noted that the cross member 69 is driven through the medium of drive disks 101 also having a number of openings 102 therein for adjustable positioning of a crank pin 103 like the crank pin 74 so that the position, phase and stroke of the cross member 69 can be changed in the same fashion as can that of the cross member 66. It is also possible to change the position of the driving chains with respect to each other on their sprockets if further phase changes are requisite, but usually the apertures 102 and 77 are adequate for normal purposes.

In a comparable fashion, the cross member 69 can be considered as a support plate supplemented by a cutter plate 106 identical with the plate 92 but located with a reverse orientation so that the several cutting edges face each other and so that the various wedges 98 are oppositely directed.

In the operation of this structure, the portions of the mechanism in contact with the dough are disassembled, sterilized and reassembled and the motor 29 is energized. This not only causes the conveyor upper run to advance in the direction of the arrow 31 or toward the left in FIGURES 1 and 2, but likewise causes the cross members 66 and 69 to reciprocate. In effect, this places such members, acting as support plates, alternately beneath and to one side of the dough guides 51 on both sides of the central trunk 38.

Prior to starting the machine, the various crank pins 74 and 103 are positioned to afford the desired stroke and cycle or phase of the machine and the adjustments 73 have been set for the desired positioning of the support plates or cross members 66 and 69. A series of icebox cookie dough rolls are placed in all or the desired ones of the guides 51. As the rolls are initially positioned, they may, for example, rest on the support plate 66, which then is reciprocated, as shown in FIGURE 4, away from supporting position. Before the cookie dough can fall completely, it is engaged and partly supported by the adjacent cutter plate 92. The sharpened edge 96 cuts horizontally through the cookie dough and severs a slice such as 107.

The dough slice 107 does not adhere to the nether side of the cutter plate, as it might normally tend to do, because the various wedges 98 serve to displace the slice from the nether surface of the plate, permit access of air between the bottom part of the cutter plate and the severed slice and as they reciprocate tend to dislodge the slice 107. It is then free to fall by gravity either directly onto the upper run 37 of the conveyor or onto a cookie sheet which has previously been placed upon and is being advanced by the conveyor 11. Following severance of the slices 107 in the charged ones of the guides 51, the reciprocation of the support plate and the cutter plate reverses and the cutter plate withdraws from beneath the rolls of dough, while the support plate takes up its former position beneath them. This motion is accompanied by a gravital fall of the rolls of cookie dough to rest again on the upper surface of the support plate. The cycle is then repeated.

In an entirely similar fashion, the reciprocation of the mechanism entailed with the cross member 69 subsequently cuts slices from the rolls of cookie dough in the guides above them and individual cookies slices are deposited across the machine onto the conveyor belt or onto cookie sheets advancing thereon. The appearance of the deposited cookie disks is as shown in FIGURE 2 under one adjustment and setup of the machine. The deposited slices 107 are carried toward the left of the machine and are discharged directly from the conveyor or the cookie sheets carrying them are discharged from the conveyor for further processing.

By suitably arranging the timing and adjustment of the machine it is possible to deposit one transverse row of cookie slices on the subjacent advancing mechanism and then to deposit directly on the first slices a second transverse row or layer of cookie slices so that a two-layer cookie is automatically produced. The two layers may or may not be the same size. This capability of the machine permits the manufacture of fancy or novelty cookies. In fact, the same mechanisms can be repeated in order to provide multi-layer products for baking or even multi-layer products of finished comestibles. For example, bread can be substituted for the cookie dough and sandwich slices can be produced.

At the conclusion of an operation, the trunk 38 can be exposed by lifting off the guide structure 41 and all of the parts of the machine are then immediately available and accessible for inspetion and cleaning. The support plates 66 and 69 are readily removed for cleaning if necessary and the cutter plates 92 are likewise readily removable and replaceable.

What is claimed is:

1. An icebox cookie machine comprising a main frame, a conveyor, means for mounting said conveyor to traverse said frame on a substantially horizontal run and in a predetermined direction, a superstructure on said frame above said conveyor, first means on said superstructure for guiding a first roll of cookie dough to travel vertically to a predetermined elevation above said conveyor run in a first predetermined path, second means on said superstructure for guiding a second roll of cookie dough to travel vertically to said predetermined elevation above said conveyor run in a second predetermined path spaced apart from said first path in said direction, a first slide frame, means for mounting said first slide frame on said main frame between said first means on said superstructure and said coveyor and for reciprocation in said direction, a first support plate, means for mounting said first support plate on said first slide frame in a position to underlie said first (guiding) means during reciprocation of said first slide frame, a first cutter plate, means for mounting said first cutter plate on said first slide frame in a position higher than said first support plate and to underlie said first means during reciprocation of said first slide frame, a second slide frame, means for mounting said second slide frame on said main frame between said second means on said superstructure and said conveyor and for reciprocation in said direction, a second support plate, means for mounting said second support plate on said second slide frame in a position to underlie said second means during reciprocation of said second slide frame, a second cutter plate, means for mounting said second cutter plate on said second slide frame in a position higher than said second support plate and to underlie said second means during reciprocation of said second slide frame, and means on said main frame for driving said first slide frame and said second slide frame to reciprocate in a predetermined phase relationship to each other.

2. An icebox cookie machine as in claim 1 and including means for changing said phase relationship.

3. An icebox cookie machine as in claim 1 in which said cutter plates are solid and include a plurality of longitudinally spaced apart and transversely staggered wedge-like projections extending downwardly from the bottom of said cutter plates.

4. An icebox cookie machine as in claim 1 including means for changing the stroke of at least one of said slide frames.

5. An icebox cookie machine as in claim 1 including means for changing the location relative to said main frame of the path of reciprocation of at least one of said slide frames.

References Cited
UNITED STATES PATENTS

| | | |
|---|---|---|
| 1,816,536 | 7/1931 | Joachimson. |
| 2,009,388 | 7/1935 | Elliott. |
| 2,583,940 | 1/1952 | Furlong. |
| 2,686,541 | 8/1954 | Harden _ _ _ _ _ _ _ _ _ _ _ _ 146—72 |

WALTER A. SCHEEL, *Primary Examiner.*

A. O. HENDERSON, *Assistant Examiner.*